United States Patent
Cordaro

(12) United States Patent (10) Patent No.: US 6,679,456 B2
Cordaro (45) Date of Patent: Jan. 20, 2004

(54) SPACECRAFT PROTECTED BY A COATING INCLUDING PYROELECTRIC/FERROELECTRIC PARTICLES, AND THE COATING MATERIAL

(75) Inventor: James F. Cordaro, Ridgecrest, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 10/364,591

(22) Filed: Feb. 10, 2003

(65) Prior Publication Data

US 2003/0141417 A1 Jul. 31, 2003

Related U.S. Application Data

(63) Continuation-in-part of application No. 10/262,115, filed on Sep. 30, 2002, which is a continuation of application No. 10/051,672, filed on Jan. 16, 2002, now Pat. No. 6,478,259, which is a continuation of application No. 09/492,723, filed on Jan. 27, 2000, now Pat. No. 6,405,979.

(51) Int. Cl.$^7$ .................................................. B64G 1/50
(52) U.S. Cl. ................................... 244/163; 244/158 R
(58) Field of Search ............................ 244/158 R, 173, 244/134, 199, 200, 163; 523/179; 178/18; 264/65; 250/83.3; 428/922

(56) References Cited

U.S. PATENT DOCUMENTS

| 4,900,631 A | 2/1990 | Yamakawa |
| 5,094,693 A | 3/1992 | Cordaro |
| 5,500,491 A | 3/1996 | Watanabe |
| 5,589,274 A | 12/1996 | Long |
| 5,641,135 A | 6/1997 | Stuart et al. |
| 5,807,909 A | 9/1998 | Cordaro et al. |
| 5,820,669 A | 10/1998 | Cordaro |
| 6,027,075 A | 2/2000 | Petrenko |

OTHER PUBLICATIONS

Egusa et al., "Piezoelectric paints as one approach to smart structural materials with health–monitoring capablilities," *Smart Materials*, vol. 7 (1998), pp. 438–445.

*Primary Examiner*—Peter M. Poon
*Assistant Examiner*—Timothy D. Collins

(57) ABSTRACT

A spacecraft protected by a coating comprises a spacecraft having an external surface, and a coating on the external surface of the spacecraft. The coating includes a binder that is an organic material or an inorganic material, and a plurality of pyroelectric pigment particles bound together by the binder. The coating initially includes a coating vehicle which is subsequently evaporated so that the coating is a solid. The coating has a thickness of from about 0.001 inch to about 0.020 inch where the binder is an organic material, and has a thickness of from about 0.001 inch to about 0.010 inch where the binder is an inorganic material.

40 Claims, 4 Drawing Sheets

SPACECRAFT PROTECTED BY A COATING INCLUDING PYROELECTRIC/FERROELECTRIC PARTICLES, AND THE COATING MATERIAL

This application is a continuation-in-part of application Ser. No. 10/262,115, filed Sep. 30, 2002, for which priority is claimed and whose disclosure is incorporated by reference; which in turn is a continuation of application Ser. No. 10/051,672, filed Jan. 16, 2002, now U.S. Pat. No. 6,478,259, for which priority is claimed and whose disclosure is incorporated by reference; which in turn is a continuation of application Ser. No. 09/492,723, filed Jan. 27, 2000, now U.S. Pat. No. 6,405,979, for which priority is claimed and whose disclosure is incorporated by reference.

This invention relates to passive thermal control of spacecraft, and, more particularly, to spacecraft protected by an external coating which aids in thermal control and protects the spacecraft against damage by a flux originating externally.

BACKGROUND OF THE INVENTION

Spacecraft are subjected to a wide range of thermal environments during service. One side of the spacecraft may face away from the sun into the void of free space, while the other side faces the sun. Heat is radiated into free space from the side of the spacecraft facing away from the sun to cool the spacecraft, but the side of the spacecraft facing the sun is heated intensively by direct sunlight.

Active and passive temperature control techniques are used to maintain the interior temperature of the spacecraft, which contains persons, electronic devices, and/or sensitive instruments, within acceptable operating limits. Active temperature control usually involves mechanical or electrical devices, such as heat pipes or electrical heaters. The present invention deals with an approach that incorporates a basic passive temperature control technique, but which may be used in an active control mode as well.

One approach to passive temperature control uses surface coatings, sometimes termed "paints", on the external surface of the spacecraft. A white coating, for example, has a low solar absorptance, while a black coating has a high solar absorptance. The selective application of such coatings to various elements of the spacecraft exterior greatly aids in controlling their temperatures. The present invention deals with a coating that is useful in spacecraft temperature control applications.

In most cases, the coating desirably also provides electrical protection to the spacecraft, in addition to providing passive thermal control. A spacecraft is sometimes subjected to electronic charging induced by a flux of electrons originating from an external source. In one example of extreme charging, a solar storm may eject a high flux of electrons from the sun. When the electron flux reaches the spacecraft, it subjects the surface of the spacecraft to a large flux of electrons. These electrons can accumulate as a static charge and eventually produce arcing (i.e., a dielectric breakdown and electrostatic discharge) at the surface of the spacecraft, which may structurally damage the spacecraft and/or interfere with sensitive electronic equipment on or in the spacecraft.

Several passive coating-based approaches are known to protect spacecraft from this type of electrical damage. In one approach a multilayer coating is provided, wherein a top coating serves the thermal control function and an underlying layer is electrically conductive to dissipate electrical charge. Such multilayer coatings are heavy and are difficult to apply because the layers must be quite precisely deposited. Single-layer electrostatic-dissipative paints are also known for spacecraft use. One such white paint, based upon the aluminum-doped zinc oxide pigment of the type disclosed in U.S. Pat. No. 5,094,693, typically has a solar absorptance of from about 0.18 to about 0.22. The white paint described in U.S. Pat. No. 5,820,669 improves upon this performance by providing a solar absorptance of less than 0.1. These paints provide excellent performance in a number of applications. However, the paints described in the '693 patent and the '669 patent are limited as to the maximum flux of electrons that may be dissipated because of the maximum electrical conductivities that are possible with their formulations, and therefore cannot perform some missions.

There is a need for a further improved thermal-control coating that is operable and stable in a space environment, which has tailorable thermal properties, and which protects the spacecraft against damage by externally induced electronic fluxes of high magnitudes. The present invention fulfills this need, and further provides related advantages.

SUMMARY OF THE INVENTION

The present invention provides a spacecraft protected by a coating, and the coating material. The color of the coating may be selected to provide desired thermal properties. The coating is structured to protect the spacecraft against electrical damage produced by the accumulation of electrical charge induced by intensive external fluxes of electrons. As a result of its high index of refraction and resulting excellent hiding power, the coating may be applied in thinner coatings than conventional protective coatings, reducing the weight and cost of the spacecraft. The coating pigment of the invention may be mixed with other pigments to optimize performance for a wide variety of conditions. The coating may be used in either a passive or an active mode.

In accordance with the invention, a spacecraft protected by a coating comprises a spacecraft having an external surface, and a coating on the external surface of the spacecraft. The coating includes a binder, and a plurality of pyroelectric pigment particles bound together by the binder. Each pyroelectric pigment particle comprises a pyroelectric pigment material. The coating initially includes a coating vehicle which is subsequently evaporated so that the coating is a solid. The coating has a thickness of from about 0.001 inch to about 0.020 inch where the binder is an organic material, and has a thickness of from about 0.001 inch to about 0.010 inch where the binder is an inorganic material.

In another embodiment, each pyroelectric/ferroelectric pigment particle may be described as comprising a ferroelectric pigment material having a dielectric permittivity exceeding about 200, typically from about 200 to about 25,000, and an electronic band gap exceeding about 2.5 electron volts. In yet another embodiment, each pyroelectric/ferroelectric pigment particle may be described as comprising a ferroelectric pigment material which stores electronic charge on the particle surface when exposed to an electron flux, and which thereafter releases the stored electronic charge over a period of time.

The present invention is a complete departure from the approaches of the prior art to multi-layer and single-layer paints and coatings which protect spacecraft from electronic charge accumulations. Only a single layer is used, avoiding the application difficulties experienced with multi-layer paints. Previously, the single-layer paints had been described as electrostatically dissipative (ESD), and the design approach was based upon obtaining a sufficiently high electrical conductivity of the paint while retaining the desired thermal properties. The high electrical conductivity dissipates the electronic charge as it builds up, and eventually conducts the charge to ground. The success of this design approach in protecting the spacecraft is based upon achieving a sufficiently high electrical conductivity in the paint. This approach works well for many spacecraft applications, but is limited in its ability to protect the spacecraft against very high electronic fluxes because there are physical limits on the ability to increase the electrical conductivity of the paint while retaining desired thermal properties.

In the present approach, the accumulation of charge on the surface of the particles and the coating is acceptable, as long as that accumulation of charge does not produce a high surface voltage that could lead to arcing (that is, a dielectric breakdown and electrostatic discharge) or other type of electrical damage. The coating absorbs and stores the electronic charge at the surface of the coating as it accumulates during a high-flux event while preventing a significant increase in surface voltage, and both simultaneously and thereafter gradually conducts the accumulated charge to ground. The coating is thereby "reset" for the next high-flux event. The coating effectively acts as an intentionally leaky thin capacitor applied over a large area of the external surface of the spacecraft. The coating therefore has a small electrical conductivity, expressed as a surface resistivity of less than or equal to about $10^{10}$ ohms per square at room temperature. This conductivity is achieved by doping the pigment material to a level that its conductivity is sufficient to provide the required conductivity to the coating. Desirably, the electrical surface resistivity is not less than about $10^8$ ohms per square, inasmuch as the doping required to achieve such low electrical surface resistivity would likely adversely affect the optical properties of the coating.

When a conventional ESD paint is operated on a surface at a low temperature, the electrical surface resistivity of the pigment and thence the paint increases so that a portion of its electrical protective capability is lost. In the coating of the present invention, the electrical surface resistivity of the pigment may change, but the polarization capability of the coating stores the electrical charge to permit a gradual dissipation according to the electrical conductivity that remains. The stored charge does not result in a high surface voltage that leads to arcing, because of the high dielectric constant of the pigment and thence the coating. The present coating thus provides protection against electron fluxes that persists at very low temperatures, an important improvement over available ESD paints.

Materials which exhibit a ferroelectric/paraelectric transition, termed herein and in the art a "ferroelectric" material, are preferred for use as the pigment in such a coating. Such ferroelectric pigment materials accumulate electronic charge without a substantial increase in surface voltage, because they preferably have a dielectric permittivity exceeding about 200. The ferroelectric pigment materials are doped so that they have sufficient electrical surface conductivity to conduct away the accumulated charge relatively slowly during and after the incidence of the external flux. They preferably have an electronic band gap exceeding about 2.5 electron volts. Ferroelectric pigment materials having the ferroelectric/paraelectric properties may be manufactured in various colors, which may be selected to produce the required thermal properties in the coating. The whiter the ferroelectric pigment material, the lower its solar absorptance.

Stated alternatively, the present approach provides for an accumulation of electrical charge at the surfaces of the ferroelectric pigment particles during a high-flux event, while gradually conducting the charge away both during the high-flux event and after it has ended. The coating is thus "adaptive" to the conditions experienced in space. In standard low-flux conditions, any introduced electronic charge is conducted away substantially as it develops. As the coating is subjected to fluxes of increasing electronic flux density, the coating harmlessly stores the charge in excess of that which may be conducted away immediately, and conducts that charge away after the external flux ends. Consequently, there is a recovery time which increases with increasing magnitude and duration of the flux, but the coating of the present invention can protect against higher fluxes than possible with the conventional approach. The conventional approach requires that the electrical charge produced by a high-flux event be conducted away as it is created in order to prevent a high voltage at the surface of the coating. However, physical limits on the doping of conventional pigments prevent such conventional paints from dissipating electrical charge sufficiently rapidly in some high-flux conditions, with the result that there may be excessively high voltages at the surface of the paint and consequent electrical arcs.

The present approach thus provides a coating which protects the surface of a spacecraft against excessive electrical charging over a wide range of conditions of external electron fluxes, while also providing passive thermal control with the possibility of active thermal control. Other features and advantages of the present invention will be apparent from the following more detailed description of the presently preferred embodiment, taken in conjunction with the accompanying drawings, which illustrate, by way of example, the principles of the invention. The scope of the invention is not, however, limited to this presently preferred embodiment.

DETAILED DESCRIPTION OF THE INVENTION

Figure 1:
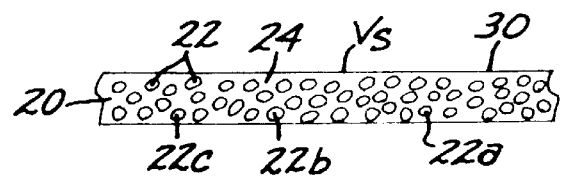
FIG. 1 is a schematic elevational view of a coating layer according to the invention.

FIG. 1 illustrates a coating layer 20 prepared according to the invention. The paint layer 20 comprises pigment particles 22 mixed with a binder 24. The pigment particles include pyroelectric/ferroelectric pigment particles 22a according to the present invention, and, optionally, active secondary particles 22b and/or inert secondary particles 22c. For example, the non-pyroelectric/ferroelectric pigment particles (serving as active secondary particles 22b) disclosed in U.S. Pat. No. 5,820,669 may be mixed with the pyroelectric/ferroelectric pigment particles 22a of the present invention. Prior to drying, a coating vehicle is also present, but the coating vehicle is evaporated during the drying operation. The compositions of the particles, the binder, and the coating vehicle, their proportions, and the preparation of the coating layer will be described in greater detail subsequently.

Figure 2:
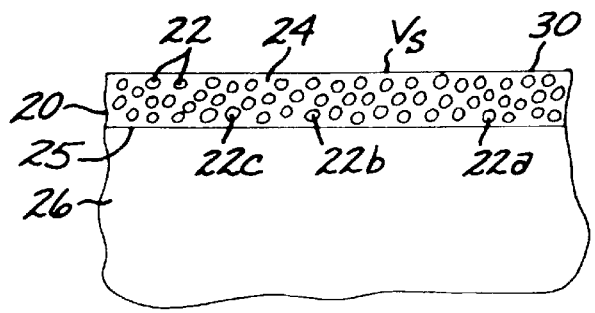
FIG. 2 is a schematic elevational view of the coating layer of FIG. 1, as applied to a substrate.

FIG. 2 illustrates the coating layer 20 applied to an external surface 25 of a substrate 26. The substrate 26 is typically the skin of the spacecraft and is at least somewhat electrically conductive.

The nature of the pyroelectric/ferroelectric particles 22a may be understood by reference to their crystallographic structures. All crystals may be placed into one of 32 symmetry point groups as presently known by crystallographers. These 32 point groups are subdivisions of the well-known seven basic crystal systems: cubic, hexagonal, rhombohedral, tetragonal, orthorhombic, monoclinic, and triclinic. Twenty-one of the 32 groups are noncentrosymmetric, in that the point group lacks a center of symmetry. A lack of a center of symmetry is necessary for the crystal to exhibit the phenomenon of piezoelectricity, whereby a homogeneous stress upon the crystal produces a net movement of positive and negative ions with respect to each other, resulting in an electric dipole moment and thus polarization. Twenty of these 21 noncentrosymmetric point groups exhibit piezoelectricity. Of the 20 point groups which exhibit piezoelectricity, 10 are known to be pyroelectric (sometimes called polar). A pyroelectric crystal has the additional characteristic of becoming spontaneously polarized and forming permanent dipole moments within a given temperature range. Non-ferroelectric pigment materials which lie within the 10 pyroelectric point groups are operable with this invention, but are not preferred because their polarization effects are relatively small. The 10 pyroelectric (or polar) point groups are (in Schoenflies notation): $C_1$, $C_2$, $C_S$ or $C_{1h}$, $C_{2v}$, $C_4$, $D_4$, $C_3$, $C_{3v}$, $C_6$, and $C_{6v}$. An included (noncentrosymmetric point group) material class is the antiferroelectrics, which are polar at the level of the crystallographic unit cell but do not have an apparent macroscopic polarization.

A special subgroup of the 10 pyroelectric point groups is known as ferroelectrics, which, with the appropriate doping, are the preferred materials for use as the pigment in the present invention. The ferroelectric material is distinguishable from the pyroelectric material in that the polarization is reversible by an electrical field of magnitude of less than the dielectric breakdown strength of the crystal itself, a condition which is not present in a material designated as exhibiting pyroelectricity alone. The preferred ferroelectric materials are thus characterized by both a spontaneous polarization resulting in permanent dipoles within a given temperature range and the characteristic of the ability to reorient the polarization by an externally applied electric field.

The particles 22a are therefore described as "pyroelectric/ferroelectric", a term used herein to mean that they are a pyroelectric material but are preferably within the subgroup of the ferroelectric materials. Because the ferroelectric materials represent the preferred embodiment, the following discussion will focus on ferroelectric materials with the understanding that materials which are pyroelectric but not ferroelectric may also be used.

There are many ferroelectric crystals and ceramic solid solutions which are operable within the scope of this invention. Of the ferroelectric subgroup of the 10 pyroelectric point groups, several are of particular importance. These include the tungsten bronze structure (for example, $PbNb_2O_6$), the oxygen octahedral structure (generalized by example $ABO_3$), the pyrochlore structure (for example, $Cd_2Nb_2O_7$), and layer structures (for example, $Bi_4Ti_3O_{12}$). Of further importance within the oxygen octahedral structures are the ceramic perovskites which are of particular importance to this invention. The perovskites include, by way of example, barium titanate $BaTiO_3$ along with its various solid solutions such as BST (barium strontium titanates), PZT (lead zirconate titanates), PLZT (lead lanthanum zirconate titanates), PT (lead titanates), PMN (lead magnesium niobates), and sodium-potassium niobates (Na, K)$NbO_3$. Other operable ferroelectrics include PZN (lead zinc niobates), PSZT (lead stannate zirconate titanates), PZ (lead zirconates), and SBT (strontium bismuth titanates). These materials are given only by way of example to define the scope of the operable materials using crystal structure, and the invention is not limited to these materials.

The pyroelectric/ferroelectric pigment is doped so that the coating, formed of pigment particles mixed into the binder, preferably has an electrical surface resistivity of less than or equal to about $10^{10}$ ohms per square at room temperature. If the surface resistivity of the coating is greater than about $10^{10}$ ohms per square at room temperature, the coating may still be operable but the rate of leakage of the stored charge will be so low that the coating may not be practical for most applications. Examples of operable dopants include lanthanum, niobium, gallium, gadolinium, and yttrium, and mixtures thereof, typically furnished in the form of their oxides. The greater the volume fraction of the pigment particles in the coating, the lower may be the conductivity of the doped pigment material to be operable, so that the properties are best expressed in terms of the coating surface resistivity rather than the pigment material.

Figure 3:
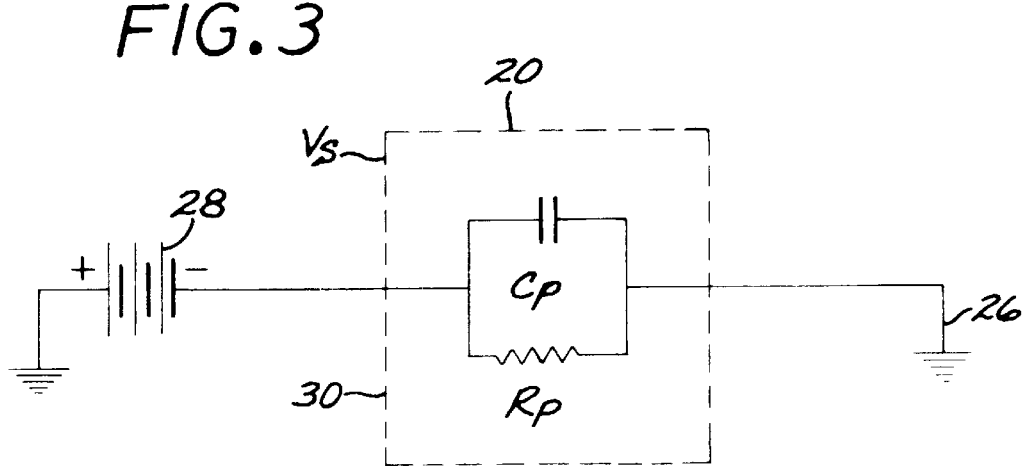
FIG. 3 is an equivalent circuit diagram for the coating layer of the invention.

The ferroelectric pigment particles 22a comprise a ferroelectric pigment material having a ferroelectric/paraelectric transition. The nature of such ferroelectric pigment materials will be discussed in more detail subsequently, but generally they exhibit a ferroelectric state at lower temperatures, a paraelectric state at higher temperatures, and a transition therebetween. FIG. 3 illustrates, as an equivalent circuit, the electrical performance of the coating layer 20 having such ferroelectric pigment particles 22a. An external flux of electrons, represented as a voltage source 28, is directed against an outer surface 30 of the coating layer 20 remote from the substrate 26. External electron fluxes in a space environment, such as produced by a solar storm or by man-made sources, are typically intense but of relatively short duration and spaced apart temporally. The coating layer 20 acts in the manner of a leaky capacitor, with an effective parallel capacitance $C_p$ and an effective parallel resistance $R_p$. The opposite side of the coating layer 20 is in electrical contact with the substrate 26, which typically is held at a ground potential. When the external electron flux is applied to the coating layer 20, charge is accumulated and temporarily stored at the surface of the capacitive coating layer 20, and is gradually conducted to the substrate 26. Charge conduction occurs simultaneously with the period of the external electron flux. However, any excess charge stored in the coating layer 20, above that which may be conducted to ground while the external electron flux is underway, is conducted to the substrate 26 after the external electron flux has ceased.

Significantly, the voltage $V_S$ at the outer surface 30 remains low because of the high permittivity of the ferroelectric/paraelectric material. This voltage $V_S$ is the key to preventing arcing and other undesirable electrical occurrences at the outer surface 30. The voltage $V_S$ must be maintained sufficiently low to prevent arcing and other undesirable electrical occurrences. The stored charge may accumulate to very high levels at the surface of the ferroelectric/paraelectric material, as long as $V_S$ remains low.

This protective concept is a departure from the prior design basis for electrostatic dissipative (ESD) paints, where the material was necessarily doped to a high level to achieve a sufficient electrical conductivity to conduct charge away from the surface as it is introduced, to maintain the surface voltage low. This prior approach is fully operable and works well in many circumstances. However, it reaches its limits where very high external electron fluxes are encountered because the conventional pigment material cannot be doped to sufficiently high levels to achieve the required conductivity, while retaining its desired color characteristics for thermal control. In the present approach, the excess charge is stored at the surface of the ferroelectric pigment material, and later leaked to ground after the external electron flux has ceased.

Figure 4:
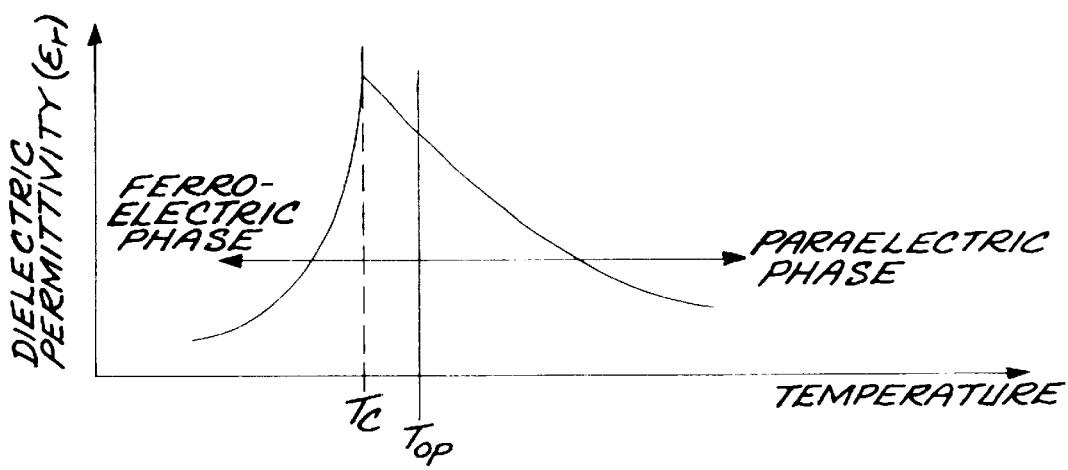
FIG. 4 is an idealized graphical depiction of the permittivity of a ferroelectric/paraelectric coating pigment as a function of temperature.

FIG. 4 illustrates the relative permittivity $\epsilon_r$ of a ferroelectric pigment material having a ferroelectric/paraelectric transition as a function of temperature T. At lower temperatures, where the ferroelectric pigment material is in the ferroelectric state, the relative permittivity rapidly increases with increasing temperature to a maximum value at the ferroelectric Curie temperature $T_C$. Above the Curie temperature, the ferroelectric pigment material becomes paraelectric, and the relative permittivity gradually falls with further increasing temperature.

Figure 5:
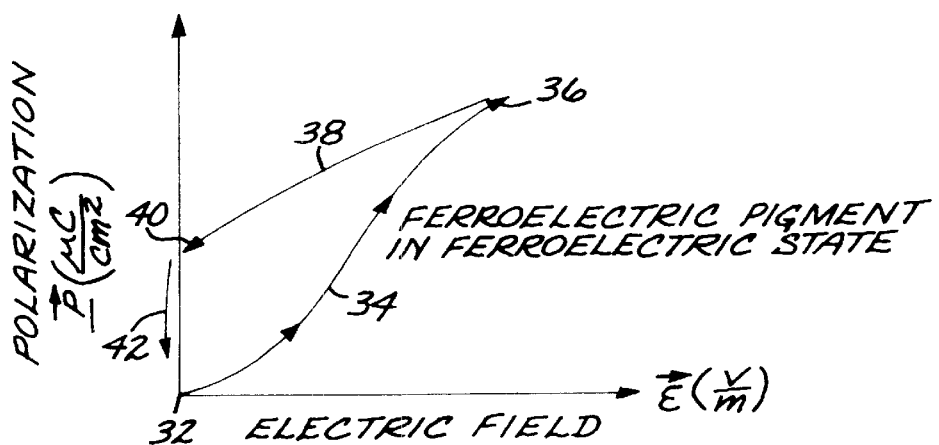
FIG. 5 is an idealized graphical depiction of the polarization of a ferroelectric coating pigment operating below the Curie temperature as a function of applied electric field.
Figure 6:
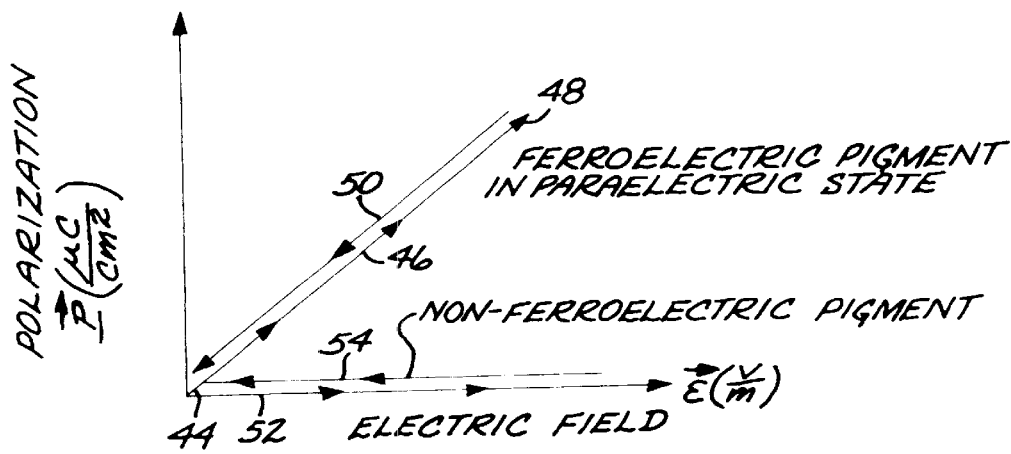
FIG. 6 is an idealized graphical depiction of the polarization of a ferroelectric coating pigment operating at a temperature just above the Curie temperature and the polarization of a non-ferroelectric ESD paint pigment of the prior art, as a function of applied electric field.

FIGS. 5 and 6 respectively illustrate the behavior of the ferroelectric/paraelectric pigment material in its two states, and provide a comparison with the prior, non-ferroelectric types of pigment materials. When the ferroelectric pigment material is below the Curie temperature and thence in its ferroelectric state, its polarization behavior P (expressed in micro-coulombs per square centimeter) in an electric field E (expressed in volts per meter) is illustrated in FIG. 5. The electric field E is produced by the external electron flux. From an initial state 32 with no applied electric field, an increasing electric field causes the material to polarize along line 34, until a maximum polarization is reached at point 36. When the electric field is reduced as the external electron flux ends, the polarization rapidly relaxes along line 38 to a remnant polarization at point 40. Where the material is electrically conductive, there may be thereafter a gradual release of the remnant polarization with zero applied electric field along line 42, possibly back to the initial state 32.

When the ferroelectric pigment material is above the Curie temperature and thence in its paraelectric state, its polarization behavior P in the electric field E is illustrated in FIG. 6. From an initial state 44, an increasing electric field causes the polarization to increase along line 46 to a maximum value 48. When the electric field is reduced as the external electron flux ceases, the polarization rapidly relaxes along line 50 to the initial state 44. The ferroelectric state of FIG. 5 thus exhibits a hysteresis behavior in the polarization, but none is observed for the paraelectric state.

FIG. 6 also illustrates the polarization behavior of a conventional, non-ferroelectric paint pigment material such as those used in the past in paints for spacecraft. As the applied electric field increases along line 52, there is only a small amount of polarization and P remains substantially zero. After reaching a maximum electric field and the electric field is decreased along line 54, P relaxes toward zero. Consequently, only a small amount of electric charge is stored at the surface of the coating material.

The ferroelectric pigment material of the present approach is preferably operated in the paraelectric state, with as large a permittivity as possible so that the voltage $V_S$ at the surface 30 of the coating layer 20 remains small. The paraelectric state is preferred because the relaxation of the polarization is rapid along line 50, and there is no remnant polarization as illustrated for the ferroelectric state along line 42 in FIG. 5. The presence of a remnant polarization could result in an indefinitely long storage of charge in the coating and an accumulation of charge that could lead to dielectric breakdown of the coating that could lead to a high-energy electrical discharge. Desirably, the dielectric permittivity of the ferroelectric pigment material is in the range of from about 200 to about 25,000. If it is lower, the invention is still operable, but the voltage $V_S$ at the surface 30 becomes increasingly large with decreasing dielectric permittivity, for a large electron flux.

Referring to FIG. 4, these conditions of paraelectric state and high dielectric permittivity are achieved when the ferroelectric pigment material is selected such that its Curie temperature $T_C$ is slightly below the minimum surface operating temperature of the coating layer, $T_{OP}$. The minimum surface operating temperature for the side of a spacecraft facing the sun is typically known from calculations of thermal performance and/or from actual measurements of surface temperatures. For example, for a communications satellite in a geosynchronous orbit, the minimum surface operating temperature of a white coating layer is typically about −70° C. (although in some cases it may be lower). The ferroelectric/paraelectric coating pigment material is therefore preferably selected so that its Curie temperature is from about 10° C. to about 20° C. below the minimum operating temperature, or from about −90° C. to about −80° C. in this presently preferred case of a minimum surface operating temperature of about −70° C. These temperatures are presented for a typical case that is presently preferred and may vary for spacecraft in other orbits or with other thermal properties, or if other surfaces of the spacecraft than that facing the sun are to be protected.

Although the preferred operational state of the ferroelectric pigment is above the Curie temperature $T_C$, and lying within the paraelectric phase state as shown by FIGS. 4 and 6, the pigment is also operable within the ferroelectric phase state. Preferably, the electrical hysteresis as shown by FIG. 5, and enclosed by lines 34, 38, and 42, is small. This behavior is the case for many ferroelectric materials operating below the Curie temperature $T_C$. Thus, the Curie temperature $T_C$ of the ferroelectric pigment material need not necessarily lie below the operating temperature $T_{OP}$ of the spacecraft as shown in FIG. 4, but it is preferred that $T_C$ lies below $T_{OP}$.

Figure 7:
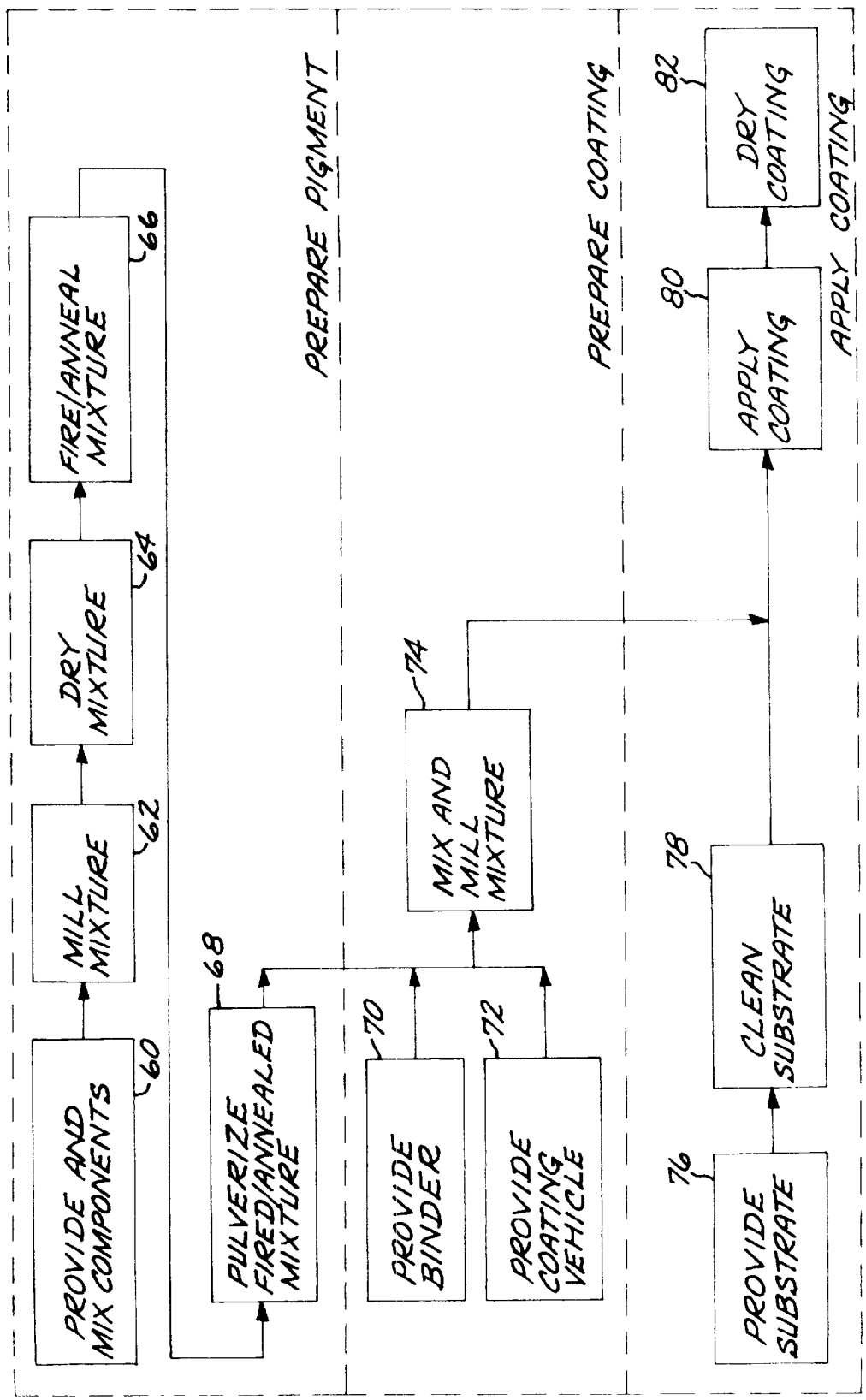
FIG. 7 is a block diagram of a method for the preparation of a coating according to the invention and the coating of a substrate.

FIG. 7 summarizes a preferred method for preparing the particles 22, for preparing the coating material used in the coating layer 20, and for coating the substrate.

To prepare the ferroelectric pigment or particles 22, the components are provided and mixed together, numeral 60. Any material exhibiting ferroelectric/paraelectric behavior—a "ferroelectric" material—may be used, but design considerations aid in selecting a specific ferroelectric/ paraelectric material for use as the ferroelectric pigment. The ferroelectric/paraelectric material is preferably selected so that its Curie temperature $T_C$ is just below the spacecraft minimum surface operating temperature $T_{OP}$. The Curie temperature is known for many ferroelectric/paraelectric materials, and may be readily determined for other materials by finding the temperature associated with the maximum value in the dielectric permittivity as illustrated in FIG. 4 or by other techniques. The value of $T_{OP}$ is known from measurements or calculations of spacecraft surface conditions.

Another important property of the ferroelectric pigment material is its color, which largely determines its solar absorptance and thence its thermal behavior. Materials with ferroelectric/paraelectric behavior may be manufactured in a wide range of colors. The pigment color of most interest for use in a coating on a sun-facing surface is white, which results in a white coating with low solar absorptance. Other ferroelectric/paraelectric materials with other colors may be used in other applications. The ferroelectric/paraelectric material also desirably has a high index of refraction, which improves its hiding power for use in a coating. Good hiding power results in the ability to use a thin coating layer, an important cost and weight consideration.

A presently most preferred ferroelectric material system exhibiting ferroelectric/paraelectric properties is $SrTiO_3$—$BaTiO_3$—$CaTiO_3$—$SrO$—$BaO$—$TiO_2$—D, where D is a dopant such as $La_2O_3$, $Nb_2O_5$, $Ga_2O_3$, $Gd_2O_3$, or $Y_2O_3$, and mixtures thereof. This system offers significant potential for the tailoring of the properties of the ferroelectric pigment to achieve particular characteristics of the coating. The ratio Sr/Ba determines the Curie temperature. The calcium content determines the breadth in the peak (as in FIG. 4) in the ferroelectric-paraelectric transition. Extra strontium, barium, and titanium are used to balance the chemical stoichiometry during processing. The lanthanum, niobium, gallium, gadolinium, and yttrium are used as dopants to make the material electrically leaky.

Within this system, a material of particular interest is lanthanum-doped strontium barium titanate, depicted as $(Sr,Ba)TiO_3:La^{3+}$, which is white in color and has an index of refraction of about 2.5. For the barium titanate form, $BaTiO_3:La^{3+}$ with a lanthanum dopant concentration of about 1 weight percent $La_2O_3$, this material has a Curie temperature of about 125° C. measured in the undoped form. The maximum dielectric permittivity, observed at the Curie temperature, is about 6000–7000.

Many other ferroelectric materials are known and may be used in relation to the present invention. Examples include $BaTiO_3$ mixed with $MgSnO_3$, $SrTiO_3$ mixed with $CaTiO_3$, $CaSnO_3$ mixed with $CaO$, $CaZrO_3$, $CaSnO_3$, and $Bi_2(SnO_3)_3$. Relaxor ferroelectric material systems such as $Pb(Mg_{1/3}Nb_{2/3})O_3$—$PbTiO_3$—$Ba(Zn_{1/3}Nb_{2/3})O_3$ are additional examples of operable ferroelectrics.

The components of the particles are provided and mixed together, numeral 60. In the presently preferred formulation, strontium titanate, strontium carbonate, barium carbonate, barium titanate, titanium oxide, titanium dioxide, and/or lanthanum oxide are used as starting materials, as appropriate to the selected composition. Thus, to prepare the ferroelectric pigment composition, the appropriate amounts of these starting materials are furnished and mixed together. A mixing medium, which later is removed, may be added to promote the mixing of the components. Non-polar solvents such as hexane are the preferred mixing medium, although other solvents such as water may also be used. Dispersants and surfactants may be used in the mixing medium, as required.

The components and the mixing medium are milled together to form a mechanical mixture, numeral 62. After milling is complete, the mixing medium is removed by evaporation, numeral 64.

The dried mixture is fired to chemically react the components together and annealed, numeral 66, at any operable temperature for the selected ferroelectric material. The firing, annealing, and subsequent cooling are performed in a non-oxidizing atmosphere, preferably an inert atmosphere such as helium or argon gas.

After cooling, the agglomerated mass resulting from the firing/annealing is lightly pulverized, as with a mortar and pestle, numeral 68. The resulting particulate has a size range of from about 0.1 micrometers to about 5.0 micrometers. The preparation of the particulate ferroelectric pigment is complete.

If the required ferroelectric pigment material is available in final form, the steps 60–68 may be skipped and the ready-made starting material may be used.

FIG. 7 provides a basic outline of a preferred synthesis technique for the pyroelectric/ferroelectric pigment using the method of mixed oxides. However, other pigment synthesis techniques are operable and may be used in certain circumstances such as those of chemical co-precipitation techniques and hydrothermal techniques. For example, such techniques might be used to produce pigment particles of more uniform size distribution or higher purity pigments.

In addition to the described ferroelectric/paraelectric pigment particles 22a, the material may contain active or inert secondary particles to modify the optical properties and/or the mechanical properties of the final material. Electrically conductive particles may be introduced. Active secondary particles 22b interact optically with incident energy, and include, for example, aluminum-doped zinc oxide particles such as disclosed in U.S. Pat. No. 5,094,693 or the particles disclosed in U.S. Pat. No. 5,820,669, whose disclosures are incorporated by reference. The active secondary particles 22b such as those disclosed in U.S. Pat. No. 5,820,669 may be present in a greater amount than the ferroelectric particles 22a, for some applications. Such active secondary particles 22b may be utilized to improve the low-temperature electrical conductivity or optical properties for particular applications. Inert secondary particles 22c are those particles which serve primarily as filler to increase the volume fraction of particulate material present without greatly modifying the optical properties. The inert secondary particles 22c may be added for economic reasons, as they are of lower cost than the ferroelectric pigment particles 22a and active secondary particles 22b. Inert secondary particles 22c can include, for example, barium sulfate, clay, or talc. In one example, the total particulate loading (total of particles 22a, 22b, and 22c) could be 10 percent by volume ferroelectric/paraelectric pigment particles 22a, 80 percent by volume of the secondary particles 22b of the '669 patent, and 10 percent by volume inert particles 22c.

The coating is prepared by providing the particulate material, prepared as described above or otherwise. A binder is provided, numeral 70, to adhere the particles together in the final product. The binder is selected to provide good coherence within the coating and good adherence of the coating to the underlying substrate, with acceptable physical properties. The binder must withstand the conditions found in the space environment, such as temperature and radiation, and must also be compatible with the environment to which the coating is exposed, such as low outgassing. The binder may be either an inorganic material or an organic material.

A preferred inorganic binder for space applications is potassium silicate.

The preferred organic binder for space applications is cross-linked and polymerized dimethyl silicone copolymer, which is flexible and resistant to degradation in ultraviolet (UV) light. This binder and other organic binder are disclosed in greater detail in U.S. Pat. No. 5,589,274, whose disclosure is incorporated by reference. The silicone polymer exhibits a good degree of deformability without cracking, both when the ferroelectric pigment is present at moderate levels and when it is not present. This deformability permits the final solid coating to deform during the bending of the substrate when a thin substrate is used, or to permit the film to deform. The deformability of the binder also improves the resistance of the coating to cracking as a result of impacts and the like during service. Other flexible polymeric materials may be used for the matrix, such as silicone-modified epoxy, polyurethane, poly(dimethylsiloxane), poly(dimethylsiloxane-co-methylphenylsiloxane), polyimide, and polyamide. However, experience has shown that the dimethyl silicone copolymer has the highest resistance to UV degradation, and it is therefore preferred.

The binder is present in an operable amount. In a typical case, the binder is present in an amount such that the ratio, by weight, of the total of all of the particulate to the binder is about 5:1 or less. If the ratio is more than about 5:1, the critical pigment volume concentration (CPVC) may be exceeded and mechanical performance is reduced. Preferably, the ratio by weight of particles to binder is from about 2:1 to about 5:1.

The mixture of pigments 22 and binder 24 is ordinarily a solid, and a coating vehicle may be added to form a solution or a slurry that may be applied using conventional coating techniques, numeral 72. One preferred coating vehicle for an inorganic-binder system is water, which does not have adverse environmental impacts when later evaporated. Organic coating vehicles such as naphtha or xylene may also be used, particularly for organic-binder systems. The amount of the coating vehicle is selected to provide a consistency that will permit application of the coating by the desired approach. For example, application by spraying requires the use of more of the coating vehicle than application by brush or roller.

The coating may instead be applied by a technique where no vehicle is used, and in that case the step 72 is omitted.

The particles, binder, and optional coating vehicle are mixed together and milled together, numeral 74, to form a liquid coating formulation in which the particles do not rapidly separate. There may be some separation over extended periods of time, but the coating is normally stirred or agitated just before or at the time of application.

In an alternative approach to the depicted order of the steps 70, 72, and 74, the particles may be milled in water, such as de-ionized water. The binder is thereafter furnished and added to the milled particles and water. These components are further mixed to disperse the particles throughout the binder.

The preparation of the coating material is complete.

The coating is used by providing the substrate 26 to be coated (such as the spacecraft external surface), numeral 76, and cleaning the substrate, numeral 78. There is no known limitation on the type of substrate. The surface of the substrate is cleaned by any operable technique, such as washing and scouring in a detergent solution, rinsing in tap water, rinsing in de-ionized water, and drying in air.

The coating is applied to the surface of the substrate, numeral 80. At the outset of the application, the surface of the substrate may be primed to improve the adhesion of the coating. Priming is preferred for application of the coating containing an inorganic binder to metallic surfaces such as aluminum. Preferably, the priming, if used, is accomplished by rubbing a small amount of the coating into the surface using a clean cloth, to achieve good contact to the surface.

The coating layer is thereafter applied by any operable technique, with spraying being preferred. As indicated earlier, the amount of coating vehicle present in the coating is selected to permit application by the preferred approach. At this point, the coating is a thin film of a liquid material containing the pigment particles.

The coating may also be applied by a plasma spray technique or the like wherein the mixture of pigment and binder is supplied to a heated region such as a plasma and directed toward the substrate. The plasma-heated mixture of pigment and binder strikes the substrate and solidifies thereon.

The coating is dried as necessary to leave a thin film of a solid material, numeral 82. In the case of an inorganic binder, drying is preferably accomplished at ambient temperature with a 50 percent or greater humidity and for a time of 14 days. Drying removes the coating vehicle by evaporation. Additionally, the drying step may accomplish a degree of curing of any curable components, as where a curable inorganic or organic binder is used.

After drying and/or curing, the coating layer 20 is preferably from about 0.001 inch to about 0.020 inch thick for an organic binder, or from about 0.001 inch to about 0.010 inch thick for an inorganic binder; more preferably, the coating layer 20 is from about 0.001 to about 0.007 inch thick for either type of binder; even more preferably, the coating layer 20 is from about 0.001 to about 0.004 inch thick for either type of binder; most preferably, the coating layer 20 is about 0.002 inch thick for either type of binder. If the coating layer 20 is thicker than about 0.020 inch for the organic binder, or thicker than about 0.010 inch for the inorganic binder, the weight of the coating layer is too high, no further advantages or performance are achieved from increasing thicknesses, and there is a tendency for the coating layer 20 to debond and "peel" from the substrate upon which it is applied. If the coating layer 20 is thinner than about 0.001 inch for both types of binders, there is a risk of incomplete coverage.

The coating may be applied as a single coat, or as multiple coats which are dried between coats. The total thickness of a single coat or the total thickness of multiple coats is as set forth above. Even where multiple coats are applied, the coating is still a "single layer" coating, because its composition is substantially homogeneous throughout all of the coats and between the coats. This single-layer coating is to be contrasted with multi-layer coatings found in some of the prior art, wherein the various layers are intentionally of greatly different compositions and performances.

The coating is complete.

Figure 8:
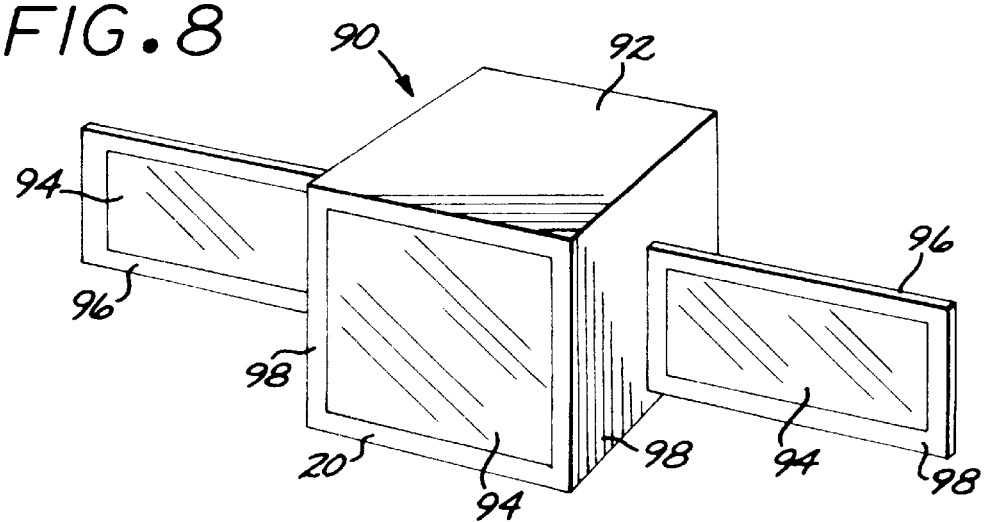
FIG. 8 is a perspective view of a spacecraft having a coating layer according to the invention.

The coating of the invention may be used in any thermal control application. Most preferably, it is used as a coating on a spacecraft, such as a spacecraft 90 illustrated in FIG. 8. The spacecraft 90, here depicted as a communications satellite that is positioned in geosynchronous orbit when in service, has a body 92 with solar panels 94 mounted either on the body 92 or on wings 96 that extend outwardly from the body 92, or both. The body 92 and wings 96 have a skin 98 which may be made of a metal, a nonmetal, or a composite material, and which may be supported by an underlying skeletal structure. The external surfaces 25 of at least some of those outwardly facing portions of the skin 98 of the body 92 and/or the wings 96 which are not solar panels are covered with the layer 20 of the coating of the invention, as described above. Typically, the coating in a white-coating form is applied to the sun-facing surfaces, as shown. The skin 98 of the spacecraft thereby serves as the substrate 26 to which the coating layer 20 is applied. The coating layer 20 provides the covered portions with passive thermal control and protection against electron fluxes that may cause electrical damage. The coating is sufficiently durable and stable in its properties for use on extended missions.

When the ferroelectric pigment is made operable in the ferroelectric mode, the optical characteristics of the coating may be made to change from that of an "adaptive" passive mode of operation to that of an "active" mode of operation. Some ferroelectric materials, such as PLZT (lead lanthanum zirconate titanates), are available in a bulk solid, transparent form, with a band gap of more than about 3 electron volts. The light transmission characteristics of such materials, such as their birefringence, may be changed through the application of an external electric field by changing the polarization state of the material. The light-reflecting characteristics of the coating layer 20 may be altered by application of an external electrical field to such a coating material. The coating material then becomes an "active" thermal control coating, having the ability to change solar absorptance and reflectance characteristics upon the application of an external electrical field. This ability to change optical characteristics is useful when, for example, the coating layer is exposed to cycles of sunlight and darkness wherein it is desirable to decrease or increase the thermal heat transfer to the spacecraft within the cycle. The optical characteristics may also be adjusted to compensate for the decreased or increased heat requirements of the spacecraft made by operation of the internal communications electronics. These capabilities are not available with conventional spacecraft paints.

Figure 9:
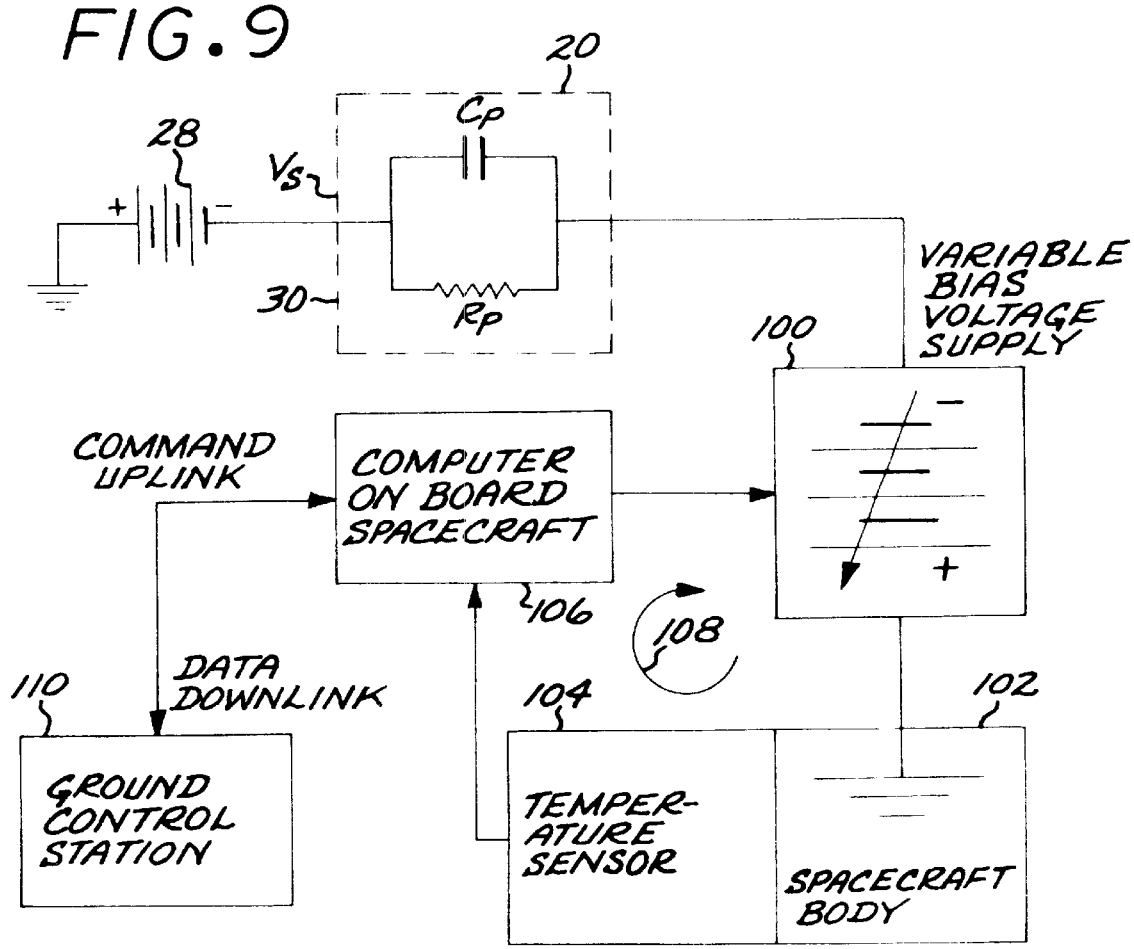
FIG. 9 is a schematic drawing of an active control mode application of the coating layer.

FIG. 9 illustrates an active control approach for the coating layer 20. In FIG. 9, the coating layer 20 is represented by its equivalent circuit of FIG. 3, whose description is incorporated. The coating layer 20 is connected to one terminal of a variable-bias voltage supply 100, whose other terminal is connected to a reference voltage such as the spacecraft body 102 that is nominally at ground potential. The temperature of the spacecraft body 102 or its skin is measured by a sensor 104, such as a thermocouple. The output signal of the sensor 104 is provided to an onboard computer 106. The onboard computer 106 observes changes of the temperature from the desired value, and adjusts the voltage of the variable-bias voltage supply 100 accordingly to maintain a "setpoint" value of temperature. The bias voltage on the coating layer 20 is thereby established. The variable-bias voltage supply 100, the spacecraft body 102, the sensor 104, and the computer 106 thus form a feedback loop, indicated by numeral 108, for autonomous control of the temperature of the spacecraft through active control of the coating layer 20. The temperature may also be controlled from an external source through adjustments to the "setpoint" temperature control of the computer 106. FIG. 9 illustrates a preferred approach for external control, a command uplink from a ground control station 110.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A spacecraft protected by a coating, comprising:
a spacecraft having an external surface; and
a coating on the external surface of the spacecraft, the coating including
a binder that is an organic material or an inorganic material, and
a plurality of pyroelectric pigment particles bound together by the binder, each pyroelectric pigment particle comprising a pyroelectric pigment material,
wherein the coating initially includes a coating vehicle and wherein the coating vehicle subsequently is evaporated so that the coating is a solid, wherein
the coating has a thickness of from about 0.001 inch to about 0.020 inch where the binder is an organic material, and has a thickness of from about 0.001 inch to about 0.010 inch where the binder is an inorganic material.

2. The spacecraft protected by the coating of claim 1, wherein the spacecraft is a communications satellite.

3. The spacecraft protected by the coating of claim 1, wherein the binder is an inorganic material.

4. The spacecraft protected by the coating of claim 1, wherein the binder is an organic material.

5. The spacecraft protected by the coating of claim 1, wherein the pyroelectric pigment material is white in color.

6. The spacecraft protected by the coating of claim 1, wherein the ratio by weight of pyroelectric pigment particles to binder is about 5:1 or less.

7. The spacecraft protected by the coating of claim 1, wherein the coating further includes
a plurality of active secondary particles.

8. The spacecraft protected by the coating of claim 1, wherein the coating further includes
a plurality of inert particles.

9. The spacecraft protected by the coating of claim 1, wherein the pyroelectric pigment material is a ferroelectric material having a ferroelectric/paraelectric transition.

10. The spacecraft protected by the coating of claim 9, wherein the ferroelectric material has a dielectric permittivity of from about 200 to about 25,000.

11. The spacecraft protected by the coating of claim 9, wherein the ferroelectric material has an electronic band gap exceeding about 2.5 electron volts.

12. The spacecraft protected by the coating of claim 1, wherein the spacecraft further includes
a bias voltage supply in communication with the coating.

13. The spacecraft protected by the coating of claim 1, wherein the coating has a thickness of from about 0.001 inch to about 0.007 inch.

14. A spacecraft protected by a coating, comprising:
a spacecraft having an external surface, and
a coating on the external surface of the spacecraft, the coating including
a binder that is an organic material or an inorganic material, and
a plurality of pyroelectric pigment particles bound together by the binder, each pyroelectric pigment particle comprising a pyroelectric pigment material having a dielectric permittivity of from about 200 to about 25,000 and an electronic band gap exceeding about 2.5 electron volts, wherein
the coating has a thickness of from about 0.001 inch to about 0.020 inch where the binder is an organic material, and has a thickness of from about 0.001 inch to about 0.010 inch where the binder is an inorganic material.

15. The spacecraft protected by the coating of claim 14, wherein the coating further includes
a plurality of active secondary particles.

16. The spacecraft protected by the coating of claim 14, wherein the coating further includes
a plurality of inert particles.

17. The spacecraft protected by the coating of claim 14, wherein the spacecraft further includes
a bias voltage supply in communication with the coating.

18. The spacecraft protected by the coating of claim 14, wherein the coating has a thickness of from about 0.001 inch to about 0.007 inch.

19. The spacecraft protected by the coating of claim 14, wherein the pyroelectric pigment material is a ferroelectric material having a ferroelectric/paraelectric transition.

20. A spacecraft protected by a coating, comprising:
a spacecraft having an external surface, and
a coating on the external surface of the spacecraft, the coating including
a binder that is an organic material or an inorganic material, and
a plurality of pigment particles bound together by the binder, each pigment particle comprising a pigment material which stores an electronic charge when exposed to an electron flux, and which thereafter releases the stored electronic charge over a period of time, wherein
the coating has a thickness of from about 0.001 inch to about 0.020 inch where the binder is an organic material, and has a thickness of from about 0.001 inch to about 0.010 inch where the binder is an inorganic material.

21. The spacecraft protected by the coating of claim 20, wherein the coating further includes
a plurality of active secondary particles.

22. The spacecraft protected by the coating of claim 20, wherein the coating further includes
a plurality of inert particles.

23. The spacecraft protected by the coating of claim 20, wherein the spacecraft further includes
a bias voltage supply in communication with the coating.

24. The spacecraft protected by the coating of claim 20, wherein the coating has a thickness of from about 0.001 inch to about 0.007 inch.

25. The spacecraft protected by the coating of claim 20, wherein the pigment particles are ferroelectric particles.

26. A coating material, comprising:
a binder that is an organic material or an inorganic material;
a plurality of pyroelectric pigment particles, each pyroelectric pigment particle comprising a pyroelectric pigment material having a ferroelectric/paraelectric transition; and
a plurality of active secondary particles, the active secondary particles being electrically conductive and non-ferroelectric,
wherein the plurality of pyroelectric pigment particles and the plurality of active secondary particles are bound together by the binder, and wherein
the coating material has a thickness of from about 0.001 inch to about 0.020 inch where the binder is an organic material, and has a thickness of from about 0.001 inch to about 0.010 inch where the binder is an inorganic material.

27. The coating material of claim 26, wherein the pyroelectric pigment material is a ferroelectric pigment material.

28. The coating material of claim 26, wherein the coating material has a thickness of from about 0.001 inch to about 0.007 inch.

29. A coating material, comprising:
a binder; and
a plurality of doped pyroelectric pigment particles, the particles being doped to a sufficient extent that the electrical surface resistivity of the coating material is less than or equal to about $10^{10}$ ohms per square at room temperature, wherein
the coating material has a thickness of from about 0.001 inch to about 0.020 inch where the binder (24) is an organic material, and has a thickness of from about 0.001 inch to about 0.010 inch where the binder (24) is an inorganic material.

30. The coating material of claim 28, wherein the pyroelectric pigment particles are made of a ferroelectric pigment material.

31. The coating material of claim 28, wherein the coating material has a thickness of from about 0.001 inch to about 0.007 inch.

32. A spacecraft protected by a coating, comprising:
a spacecraft having an external surface, and
a coating on the external surface of the spacecraft, the coating including
a binder that is an organic material or an inorganic material, and
a plurality of ferroelectric pigment particles bound together by the binder, each ferroelectric pigment particle comprising a ferroelectric pigment material,
wherein the coating initially includes a coating vehicle and wherein the coating vehicle subsequently is evaporated so that the coating is a solid, wherein
the coating has a thickness of from about 0.001 inch to about 0.020 inch where the binder is an organic material, and has a thickness of from about 0.001 inch to about 0.010 inch where the binder is an inorganic material.

33. The spacecraft protected by the coating of claim 32, wherein the spacecraft is a communications satellite.

34. The spacecraft protected by the coating of claim 32, wherein the binder is an inorganic material.

35. The spacecraft protected by the coating of claim 32, wherein the binder is an organic material.

36. The spacecraft protected by the coating of claim 32, wherein the ferroelectric pigment material is white in color.

37. The spacecraft protected by the coating of claim 32, wherein the ratio by weight of ferroelectric pigment particles to binder is about 5:1 or less.

38. The spacecraft protected by the coating of claim 32, wherein the coating further includes
a plurality of active secondary particles.

39. The spacecraft protected by the coating of claim 32, wherein the coating further includes
a plurality of inert particles.

40. The spacecraft protected by the coating of claim 32, wherein the coating has a thickness of from about 0.001 inch to about 0.007 inch.

* * * * *